(12) United States Patent
Lynn

(10) Patent No.: US 7,980,264 B2
(45) Date of Patent: Jul. 19, 2011

(54) SLURRY CATALYST FLOW SPLITTERS AND METHODS OF USING THE SAME

(75) Inventor: Timothy R. Lynn, Glen Gardner, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 12/991,315

(22) PCT Filed: Jun. 3, 2009

(86) PCT No.: PCT/US2009/046093
§ 371 (c)(1),
(2), (4) Date: Nov. 5, 2010

(87) PCT Pub. No.: WO2009/149159
PCT Pub. Date: Dec. 10, 2009

(65) Prior Publication Data
US 2011/0088787 A1 Apr. 21, 2011

Related U.S. Application Data

(60) Provisional application No. 61/130,867, filed on Jun. 4, 2008.

(51) Int. Cl.
*G05D 11/13* (2006.01)
(52) U.S. Cl. ............ 137/114; 137/101.19; 137/118.04; 422/110
(58) Field of Classification Search .............. 137/98, 137/100, 101.19, 111, 114, 118.04; 422/110
See application file for complete search history.

(56) References Cited

U.S. PATENT DOCUMENTS

| | | | | |
|---|---|---|---|---|
| 2,715,610 | A | * | 8/1955 | Thompson ............... 137/101.19 |
| 3,762,428 | A | * | 10/1973 | Beck et al. ...................... 137/88 |
| 4,112,515 | A | * | 9/1978 | Sandow .......................... 366/17 |
| 4,234,007 | A | * | 11/1980 | Titone et al. ............ 137/101.19 |
| 4,277,254 | A | * | 7/1981 | Hanson ........................ 48/189.1 |
| 4,681,530 | A | * | 7/1987 | Huber .............................. 431/89 |
| 4,998,672 | A | * | 3/1991 | Bordaz et al. ................... 239/61 |
| 5,098,667 | A | * | 3/1992 | Young et al. ................... 422/111 |
| 5,317,036 | A | | 5/1994 | Brady, III et al. |
| 5,693,727 | A | | 12/1997 | Goode et al. |
| 6,075,101 | A | | 6/2000 | Lynn et al. |
| 6,245,868 | B1 | | 6/2001 | Agapiou et al. |
| 6,606,675 | B1 | | 8/2003 | Godbole |
| 6,608,149 | B2 | | 8/2003 | Mawson et al. |
| 6,956,089 | B2 | | 10/2005 | Mawson et al. |
| 7,235,614 | B2 | | 6/2007 | Smith et al. |
| 2005/0186126 | A1 | | 8/2005 | Burns et al. |

* cited by examiner

*Primary Examiner* — Stephen M Hepperle
*Assistant Examiner* — William McCalister

(57) ABSTRACT

A system for feeding a slurry catalyst composition including: a primary slurry feed system comprising a primary slurry flow meter and a primary catalyst injection device, wherein the primary slurry flow meter measures a primary slurry catalyst composition flow rate to the primary catalyst injection device; and a secondary slurry feed system comprising a secondary slurry flow meter, a secondary carrier liquid, a secondary carrier liquid control device, and a secondary catalyst injection device, wherein the secondary slurry flow meter measures a secondary slurry catalyst composition flow rate to the secondary catalyst injection device, wherein the secondary carrier liquid control device controls a process parameter of the secondary slurry feed system based a ratio of the primary slurry catalyst composition flow rate to the secondary slurry catalyst composition flow rate.

10 Claims, 1 Drawing Sheet

SLURRY CATALYST FLOW SPLITTERS AND METHODS OF USING THE SAME

CROSS-REFERENCE TO RELATED APPLICATIONS

This application is a National Stage application under 36 U.S.C. §371 of International Application No. PCT/US2009/046093, filed Jun. 3, 2009, that claims the benefit of Ser. No. 61/130,867, filed Jun. 4, 2008, the disclosures of which are incorporated by reference in their entireties.

FIELD OF THE INVENTION

This disclosure generally relates to a system and method for feeding a slurry catalyst to a polyolefin production system. More specifically this disclosure relates to feeding a slurry catalyst to multiple injection points such that the flow is evenly distributed to each of the injection points. This disclosure also relates to a system and method for splitting the slurry catalyst flow between multiple catalyst injection points such that the flow to each injection point is controlled relative to a slurry catalyst flow through a primary injection point.

BACKGROUND

Advances in polymerization technology have provided more efficient, highly productive and economically enhanced processes. Especially illustrative of these advances is the development of technology utilizing metallocene catalyst systems and other advanced metallocene-type catalyst systems. However, metallocene and metallocene-type catalysts typically exhibit high catalyst activity as soon as the catalyst is injected into the reaction system. Thus, the catalyst should be injected in more than one location in commercial-scale reactors to provide good distribution of catalyst in the reactor.

It is often useful to support various types of catalyst compounds, for example metallocene and metallocene-type catalyst compounds, on a carrier such as, for example, silica or alumina. The use of supported or heterogeneous catalyst systems increases process efficiencies by assuring that the forming polymeric particles achieve a shape and density that improves reactor operability and ease of handling. These supported catalyst systems are often suspended in solution to form a catalyst slurry composition, and the catalyst slurry composition is injected into the polymerization reactor through various catalyst injection systems.

Feeding supported slurry catalyst compositions can prove problematic for high activity catalysts, which may require low slurry catalyst composition flow rates. The equipment used to measure and control the flow rates of the slurry catalyst composition may have very small passages, which are prone to pluggage by agglomerates that occasionally form in the slurry catalyst composition. This is particularly problematic for control valves in the system that injects the slurry catalyst composition into the reaction system. These problems are exacerbated when an already small flow rate must be split into more than one injection point. The problems are exacerbated even further when it is desirable to distribute the slurry catalyst composition uniformly in the reactor, which requires the flow rate of the slurry catalyst composition be fairly uniform between each of the multiple catalyst injection points.

U.S. Pat. Nos. 6,606,675, 6,608,149, and 6,956,089 disclose a catalyst composition prepared by continuously combining a catalyst component slurry with a catalyst component solution to form a slurry catalyst composition, then introducing the slurry catalyst composition into an operating polymerization reactor. These patents also disclose systems for delivery of the slurry catalyst composition to the reaction system.

U.S. Pat. Nos. 5,317,036, 5,693,727, 6,075,101, 6,245,868, and 7,235,614 all describe various processes and techniques for introducing supported and unsupported catalyst compositions in liquid form to a polymerization reactor.

In view of the references described above, there exists a need to deliver a slurry catalyst composition to multiple feed points in a polymerization reactor that is not prone to plugging when attempting to control low flow rates of the slurry catalyst composition. Furthermore, there exists a need to precisely control the flow rate to each of the multiple feedpoints relative to the other feedpoints. In particular, there exists a need to uniformly deliver a slurry catalyst composition to each of multiple feed points in a polymerization reactor.

SUMMARY

In various embodiments, the current invention provides a system and method for feeding a slurry catalyst composition. Embodiments of the invention allow the user to control the delivery of a slurry catalyst composition to each of multiple feed points in a polymerization reactor. Thus, the slurry catalyst composition may be supplied uniformly to each of the feed points.

In one class of embodiments, the invention provides for a system for feeding a slurry catalyst composition including: a primary slurry feed system comprising a primary slurry flow meter and a primary catalyst injection device, wherein the primary slurry flow meter measures a primary slurry catalyst composition flow rate to the primary catalyst injection device; and a secondary slurry feed system comprising a secondary slurry flow meter, a secondary carrier liquid, a secondary carrier liquid control device, and a secondary catalyst injection device, wherein the secondary slurry flow meter measures a secondary slurry catalyst composition flow rate to the secondary catalyst injection device, wherein the secondary carrier liquid control device controls a process parameter of the secondary slurry feed system based a ratio of the primary slurry catalyst composition flow rate to the secondary slurry catalyst composition flow rate.

In at least one embodiment, the process parameter of the secondary slurry feed system is the secondary slurry catalyst composition flow rate, a secondary carrier liquid flow rate, a backpressure in the secondary slurry feed system, or a pressure differential in the secondary slurry feed system.

In some embodiments, the ratio of the primary slurry catalyst composition flow rate to the secondary slurry catalyst composition flow rate can be controlled at about 0.9:1 to about 1.1:1.

In at least one embodiment, the system for feeding a slurry catalyst composition comprises at least two secondary slurry feed systems In at least one embodiment, the secondary slurry feed system further comprises a secondary carrier liquid flow meter, a secondary carrier liquid controller, and a secondary slurry flow controller, wherein the process parameter controlled by the secondary carrier liquid control device is a secondary carrier liquid flow rate measured by the secondary carrier liquid flow meter, wherein the secondary carrier liquid controller controls the secondary carrier liquid control device based on the secondary carrier liquid flow rate and a secondary carrier flow setpoint from the secondary slurry flow controller.

In at least one embodiment, the secondary slurry flow controller receives the secondary slurry catalyst composition flow rate as a measured process variable and the primary slurry catalyst composition flow rate as a process variable setpoint and generates the secondary carrier flow setpoint.

In any embodiment, the secondary slurry feed system may further include: a secondary slurry flow control device; a secondary carrier/catalyst mixer; and a secondary carrier gas.

In any embodiment, the primary slurry feed system may further include: a primary slurry flow control device; a primary carrier liquid; a primary carrier liquid control device; a primary carrier/catalyst mixer; a primary catalyst injection device; and a primary carrier gas.

Another class of embodiments provides a system for feeding a slurry catalyst composition including: a primary slurry feed system comprising a primary slurry flow meter and a primary catalyst injection device, wherein the primary slurry flow meter measures a primary slurry catalyst composition flow rate to the primary catalyst injection device; and a secondary slurry feed system comprising a secondary slurry flow meter, a secondary carrier gas, a secondary carrier gas control device, and a secondary catalyst injection device, wherein the secondary slurry flow meter measures a secondary slurry catalyst composition flow rate to the secondary catalyst injection device, wherein the secondary carrier gas control device controls a process parameter of the secondary slurry feed system based a ratio of the primary slurry catalyst composition flow rate to the secondary slurry catalyst composition flow rate.

In at least one embodiment, the process parameter of the secondary slurry feed system is a secondary slurry catalyst composition flow rate, a secondary carrier gas flow rate, a backpressure in the secondary slurry feed system, or a pressure differential in the secondary slurry feed system.

In another embodiment, the secondary slurry feed system further comprises a secondary carrier gas flow meter, a secondary carrier gas controller, and a secondary slurry flow controller, wherein the process parameter controlled by the secondary carrier gas control device is a secondary carrier gas flow rate measured by the secondary carrier gas flow meter, wherein the secondary carrier gas controller controls the secondary carrier gas control device based on the secondary carrier gas flow rate and a secondary carrier flow setpoint from the secondary slurry flow controller.

Another class of embodiments provides a method of controlling a slurry catalyst flow by: providing a slurry catalyst composition; splitting the slurry catalyst composition into a primary slurry catalyst composition and a secondary slurry catalyst composition; measuring a primary slurry catalyst composition flow rate of the primary slurry catalyst composition; supplying the primary slurry catalyst composition to a primary catalyst injection device; measuring a secondary slurry catalyst composition flow rate of the secondary slurry catalyst composition; controlling a process parameter of the secondary slurry feed system based on a ratio of the primary slurry catalyst composition flow rate to the secondary slurry catalyst composition flow rate, wherein the process parameter affects the secondary slurry catalyst composition flow rate; and supplying the secondary slurry catalyst composition to a secondary catalyst injection device.

In at least one embodiment, the ratio of the primary slurry catalyst composition flow rate to the secondary slurry catalyst composition flow rate is effectively controlled by controlling the process parameter.

In another embodiment, the process parameter of the secondary slurry feed system is controlled such that the ratio of the primary slurry catalyst composition flow rate to the secondary slurry catalyst composition flow rate is about 0.9:1 to about 1.1:1.

In at least one embodiment, the process parameter of the secondary slurry feed system is the secondary slurry catalyst composition flow rate, a secondary carrier liquid flow rate, a secondary carrier gas flow rate, a backpressure in the secondary slurry feed system, or a pressure differential in the secondary slurry feed system.

In at least one embodiment, the process parameter of the secondary slurry feed system is a secondary carrier liquid flow rate, and the method further includes the steps of: supplying a secondary carrier liquid; comparing the primary slurry catalyst composition flow rate and the secondary slurry catalyst composition flow rate; and increasing or decreasing the secondary carrier liquid flow rate to adjust the secondary catalyst composition flow rate relative to the primary slurry catalyst composition flow rate.

In at least one embodiment, the secondary carrier liquid flow rate is increased if the secondary slurry catalyst composition flow rate is higher than the primary slurry catalyst composition flow rate or the secondary carrier liquid flow rate is decreased if the secondary slurry catalyst composition flow rate is lower than the primary slurry catalyst composition flow rate.

In another embodiment, the comparing the primary slurry catalyst composition flow rate and the secondary slurry catalyst composition flow rate, and the increasing or decreasing the secondary carrier liquid flow rate are performed by an automated control system.

Yet another embodiment adjusts the primary carrier liquid flow rate or primary carrier gas flow rate to adjust the secondary catalyst composition flow rate relative to the primary slurry catalyst composition flow rate.

In any embodiment, a secondary carrier gas may be supplied.

In at least one embodiment, the process parameter of the secondary slurry feed system is a secondary carrier gas flow rate, and wherein the method includes the steps of: comparing the primary slurry catalyst composition flow rate and the secondary slurry catalyst composition flow rate; and increasing or decreasing the secondary carrier gas flow rate to adjust the secondary catalyst composition flow rate relative to the primary slurry catalyst composition flow rate.

DETAILED DESCRIPTION

Figure 1:
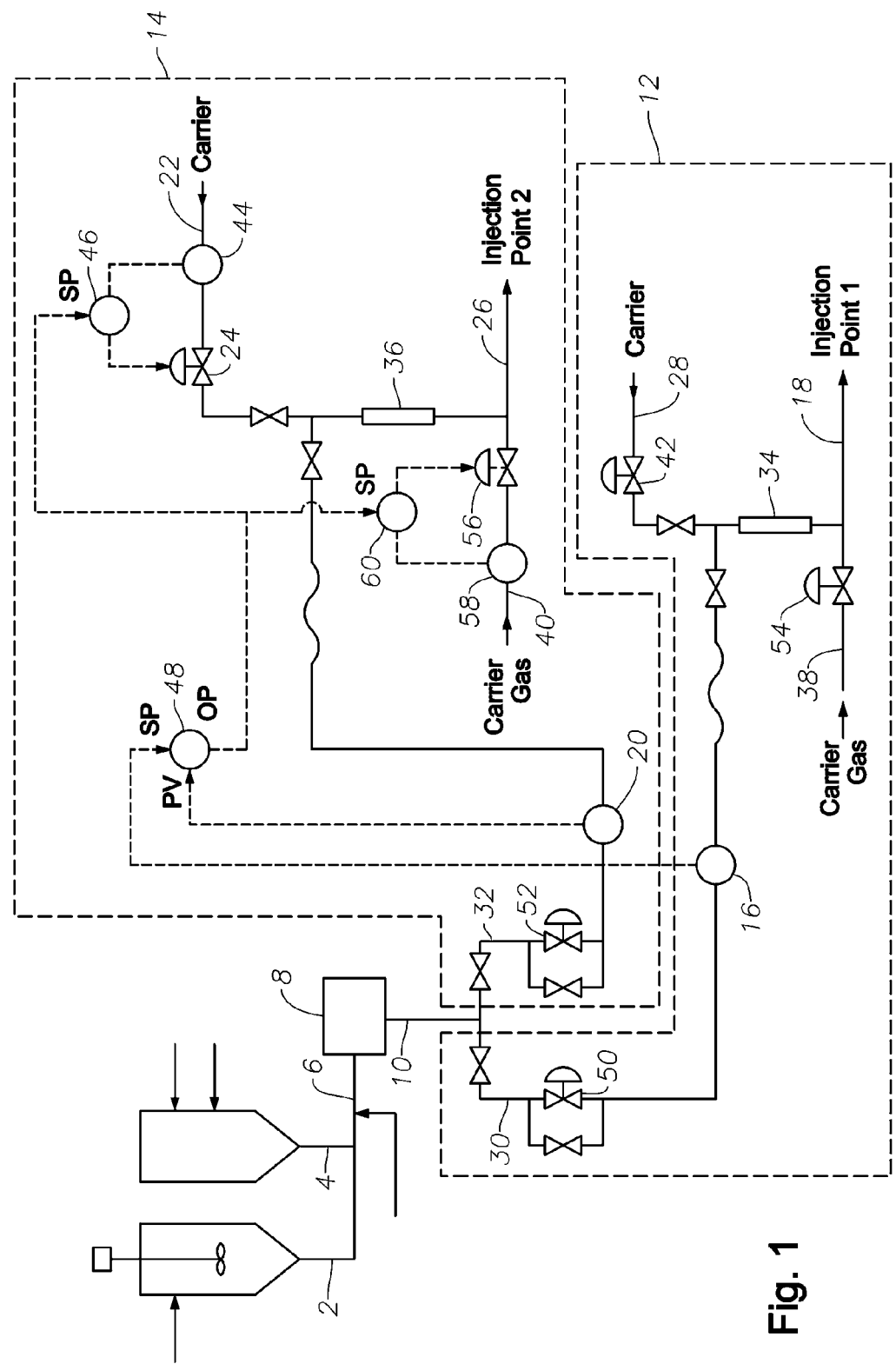
FIG. 1 is a schematic drawing of an embodiment of the invention.

Before the present compounds, components, compositions, devices, softwares, hardwares, equipments, configurations, schematics, systems, and/or methods are disclosed and described, it is to be understood that unless otherwise indicated this invention is not limited to specific compounds, components, compositions, devices, softwares, hardwares, equipments, configurations, schematics, systems, methods, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

Generally, embodiments disclosed herein relate to a system and method for feeding a slurry catalyst composition. In particular, the embodiments herein relate to a system and method for feeding a slurry catalyst composition to multiple catalyst injection points.

U.S. Pat. Nos. 6,606,675, 6,608,149, and 6,956,089 disclose systems for producing a slurry catalyst composition prepared by continuously combining a catalyst component slurry with a catalyst component solution to form a slurry catalyst composition. In one exemplary process, a catalyst component slurry 2 may be combined with and/or reacted with a catalyst component solution 4 to form a catalyst/component mixture 6. The catalyst/component mixture 6 may then be sent to a mixing device 8. After sufficient contact time, a slurry catalyst composition 10 is removed from the mixing device 8 and is then introduced to a polymerization reactor utilizing a primary and/or secondary slurry catalyst feed system 12, 14 of the current invention. Thus, as used herein, a "slurry catalyst composition" or "slurry catalyst" 10 refers to the catalyst-containing mixture that exits the mixing device 8. Because it is desirable to feed the slurry catalyst composition to multiple feed points, the flow exiting the in-line mixer is typically divided between the multiple feed points.

When feeding the slurry catalyst composition 10 to multiple injection points from one slurry catalyst feed source, it has been found that changes in carrier liquid or carrier gas flow rates at each injection point have a direct affect on the slurry catalyst flow rate to that injection point. Thus, the current invention provides a system and method to control the slurry catalyst flow to the individual injection points by controlling the carrier liquid or carrier gas flow rates at each injection point.

One class of embodiments of the current invention provides a system for feeding a slurry catalyst composition 10 comprising: a primary slurry feed system 12 comprising a primary slurry flow meter 16 and a primary catalyst injection device 18, wherein the primary slurry flow meter measures a primary slurry catalyst composition flow rate to the primary catalyst injection device; and a secondary slurry feed system 14 comprising a secondary slurry flow meter 20, a secondary carrier liquid 22, a secondary carrier liquid control device 24, and a secondary catalyst injection device 26, wherein the secondary slurry flow meter measures a secondary slurry catalyst composition flow rate to the secondary catalyst injection device, wherein the secondary carrier liquid control device controls a process parameter of the secondary slurry feed system based a ratio of the primary slurry catalyst composition flow rate to the secondary slurry catalyst composition flow rate. As used herein "a secondary slurry feed system" means at least one secondary slurry feed system. Thus, on any embodiment, the system for feeding a slurry catalyst composition may comprise more than one secondary slurry feed system 14. In one embodiment, the system for feeding a slurry catalyst composition comprises at least two secondary slurry feed systems 14. Furthermore, more than one system for feeding a slurry catalyst composition 10 may be used to feed a slurry catalyst to a reaction system.

In any embodiment herein, the primary slurry flow meter 16 and secondary slurry flow meter 20 measure the flow of slurry catalyst through the respective primary and secondary slurry feed system 12, 14. The primary and secondary slurry flow meters 16, 20 may be of any design suitable for measuring the flow of the slurry catalyst composition. In any embodiment, the primary and secondary slurry flow meters 16, 20 may be Coriolis-type flow meters, such as the Micromotion CFM-010M. Coriolis-type flow meters may generate about 20 to 70 kPa (3 to 10 psi) differential pressure at typical injection system flow rates.

In any embodiment, a primary carrier liquid 28 may be combined with a primary slurry catalyst composition 30 and/or a secondary carrier liquid 22 may be combined with a secondary slurry catalyst composition 32 before the slurry catalyst composition is fed into the polymerization reactor. The primary and secondary carrier liquid 18, 22 may be introduced into the slurry catalyst composition that is moving in a downward direction. The mixture of the slurry catalyst composition and the carrier liquid may pass through a primary or secondary carrier/catalyst mixer 34, 36 respectively or a length of conduit, for example tubing, for mixing before being injected into the polymerization reactor or contacted with a primary or secondary carrier gas 38, 40. The primary or secondary carrier liquid 28, 22 may be a non-reactive liquid, such as an alkane like isopentane or hexane, or may be an alkene comonomer, such as hexene, butene, or other suitable liquid that is normally added to the process. A suitable liquid preferably aids in the dispersal of the slurry catalyst composition once the mixture exits the primary or secondary injection device 18, 22 in the polymerization reactor.

Any embodiment may comprise a primary or secondary carrier liquid control device 42, 24. Any control device, for example a flow control motor valve, may be used that is suitable to control the flow of the primary or secondary carrier liquid 28, 22.

In any embodiment, the secondary liquid carrier control device 24 controls a process parameter of the secondary slurry feed system 14. The process parameter may be the secondary slurry catalyst composition flow rate or may be any process parameter that affects the flow rate of the secondary slurry catalyst composition 32. As discussed above, various process parameters affect the slurry flow. For example, raising the secondary carrier liquid flow rate has been found to decrease the secondary slurry catalyst composition flow rate. Although not wishing to be bound by theory, it is thought that increasing the flow of secondary carrier liquid 22, increases the backpressure in the secondary slurry feed system 14, thus decreasing the flow of slurry catalyst composition 32 from the supply system to the secondary slurry feed system 14. Thus, in at least one embodiment, the process parameter of the secondary slurry feed system 14 may be a secondary carrier liquid flow rate, a backpressure in the secondary slurry feed system, or a pressure differential in the secondary slurry feed system.

In any embodiment herein, the secondary carrier liquid control device 24 may control the process parameter based on a ratio of the primary slurry catalyst composition flow rate to the secondary slurry catalyst composition flow rate. By varying the secondary carrier liquid flow, the selected process parameter is varied and the secondary catalyst composition flow rate is varied, thus the ratio of the primary to secondary catalyst composition flow rate is affected. That is, because the process parameter that is to be controlled is selected to either directly control or affect the secondary slurry catalyst composition flow rate, by controlling the process parameter, the flow rate of the secondary catalyst composition is controlled at a desired ratio to the primary catalyst composition flow rate. In at least one embodiment, the ratio of the primary the primary slurry catalyst composition flow rate to the secondary slurry catalyst composition flow rate is controlled between about 0.8:1 to about 1.2:1, or between about 0.9:1 to about 1.1:1.

In any embodiment herein, the secondary slurry feed system 14 further comprises a secondary carrier liquid flow meter 44, a secondary carrier liquid controller 46, and a secondary slurry flow controller 48. In some embodiments, the process parameter controlled by the secondary carrier liquid control device 24 is a secondary carrier liquid flow rate measured by the secondary carrier liquid flow meter 44. The secondary carrier liquid controller 46 controls the secondary carrier liquid control device 24 based on the secondary carrier liquid flow rate and a secondary carrier flow setpoint from the secondary slurry flow controller 48. The secondary carrier liquid flow meter 44, and the secondary carrier liquid controller 46 can be any standard industry design suitable for measuring and controlling the carrier liquid flow. In any embodiment the secondary slurry flow controller 48 can be any standard industry design suitable for measuring and controlling the slurry catalyst composition. In at least one embodiment, the flow rate of the secondary carrier liquid 22 is controlled by an automated control loop. The setpoint for the secondary carrier liquid flow rate is generated by the secondary slurry flow controller 48. As the setpoint changes and the secondary carrier liquid flow rate changes, the secondary slurry composition flow is affected. That is, as the flow rate of the secondary carrier liquid 22 is raised, the secondary slurry catalyst composition flow rate drops and vice-versa. Thus, in some embodiments, the secondary slurry composition flow rate may be controlled by the secondary slurry flow controller 48 by controlling the setpoint of the secondary carrier liquid controller 46, which in turn controls the flow rate of the secondary carrier liquid 22.

In some embodiments herein, the secondary slurry flow controller 48 may receive the secondary slurry catalyst composition flow rate as a measured process variable and the primary slurry catalyst composition flow rate as a process variable setpoint and generates the carrier flow setpoint for the secondary carrier liquid controller 46. By receiving the primary slurry catalyst composition flow rate as a process variable setpoint, the ratio of the primary to secondary slurry composition flow rate is controlled at about 1:1. In other embodiments, the secondary slurry flow controller 48 is a ratio controller, wherein the secondary slurry flow controller receives the primary and secondary slurry flow rates and generates the carrier flow setpoint to the secondary carrier liquid controller 46 based on a ratio of the primary slurry flow rate to secondary slurry flow rate.

In any embodiment herein, the secondary slurry feed system 14 may further comprise a primary or secondary slurry flow control device 50, 52. The primary or secondary slurry flow control device 50, 52 may be used to shut the flow off to the primary or secondary slurry feed system 12, 14 or otherwise adjust the flow or pressure in the primary or secondary slurry feed system.

Any embodiment herein may further comprise a primary or secondary carrier gas 38, 40 to help carry the slurry catalyst composition into the polymerization reactor. The primary or secondary carrier gas 38, 40 may be an inert gas, for example nitrogen. A primary or secondary carrier gas control device 54, 56, may control the flow of the primary or secondary carrier gas 38, 40 respectively.

Any embodiment herein may further comprise a primary or secondary carrier/catalyst mixer 34, 36. The primary or secondary carrier/catalyst mixer 34, 36 may be an in-line mixing device designed for downward flow that provides mixing of the slurry catalyst composition and the primary or secondary carrier liquid 28, 22. In at least one embodiment, the primary or secondary carrier/catalyst mixer 34, 36 is located after the primary or secondary slurry catalyst composition and the primary or secondary carrier liquid 28, 22 are combined, and before the primary or secondary carrier gas 38, 40 is injected into the mixed stream.

Any embodiment herein may also comprise a primary carrier liquid control device 42 used to control the flow of a primary carrier liquid 28 to a primary catalyst injection device 18.

One class of embodiments provides a system for feeding a slurry catalyst composition comprising: a primary slurry feed system 12 comprising a primary slurry flow meter 16 and a primary catalyst injection device 18, wherein the primary slurry flow meter measures a primary slurry catalyst composition flow rate to the primary catalyst injection device; and a secondary slurry feed system 14 comprising a secondary slurry flow meter 20, a secondary carrier gas 40, a secondary carrier gas control device 56, and a secondary catalyst injection device 26, wherein the secondary slurry flow meter measures a secondary slurry catalyst composition flow rate to the secondary catalyst injection device, and wherein the secondary carrier gas control device 56 controls a process parameter of the secondary slurry feed system 14 based a ratio of the primary slurry catalyst composition flow rate to the secondary slurry catalyst composition flow rate.

In any embodiment herein, the secondary gas control device 56 may control a process parameter of the secondary slurry feed system 14. The process parameter may be the flow rate of the secondary slurry catalyst composition 32 or may be any process parameter that affects the flow rate of the secondary slurry catalyst composition 32. Thus, in at least one embodiment, the process parameter of the secondary slurry feed system 14 may be the secondary slurry catalyst composition flow rate, a secondary carrier gas flow rate, a backpressure in the secondary slurry feed system 14, or a pressure differential in the secondary slurry feed system 14.

The secondary carrier gas control device 56 may control the process parameter based on a ratio of the primary slurry catalyst composition flow rate to the secondary slurry catalyst composition flow rate. The process parameter may be selected such that the secondary catalyst composition flow rate is varied by varying the process parameter, thus the ratio of the primary to secondary catalyst composition flow rate is affected. In at least one embodiment, the ratio of the primary the primary slurry catalyst composition flow rate to the secondary slurry catalyst composition flow rate my be controlled between about 0.8:1 to about 1.2:1, or between about 0.9:1 to about 1.1:1.

In at least one embodiment of the invention, the secondary slurry feed system 14 further comprises a secondary carrier gas flow meter 58, a secondary carrier gas controller 60, and a secondary slurry flow controller 48, wherein the process parameter controlled by the secondary carrier gas control controller 60 is a secondary carrier gas flow rate measured by the secondary carrier gas flow meter 58, wherein the secondary carrier gas controller 60 controls the secondary carrier gas control device 56 based on the secondary carrier gas flow rate and a secondary carrier flow setpoint from the secondary slurry flow controller 48.

In some embodiments, the secondary slurry flow controller 48 receives the secondary slurry catalyst composition flow rate as a measured process variable and the primary slurry catalyst composition flow rate as a process variable setpoint and generates the carrier flow setpoint for the secondary carrier gas controller 60. By receiving the primary slurry catalyst composition flow rate as a process variable setpoint, the ratio of the primary to secondary slurry catalyst composition flow rate is controlled at about 1:1. In other embodiments, the secondary slurry flow controller 48 is a ratio controller, wherein the secondary slurry flow controller 48 receives the primary and secondary slurry catalyst flow rates and generates the carrier flow setpoint to the secondary carrier gas controller 60 based on a ratio of the primary slurry catalyst flow rate to secondary slurry catalyst flow rate.

Another class of embodiments provides a method of controlling a slurry catalyst flow. In this embodiment, a slurry catalyst composition 26 is provided and then split into a primary slurry catalyst composition 30 and a secondary slurry catalyst composition 32. The flow rate of the primary slurry catalyst composition 30 to a primary catalyst injection device 18 is measured, for example, by a primary slurry flow meter 16. Furthermore, the flow rate of the secondary slurry catalyst composition 32 to a secondary catalyst injection device 26 is measured, for example, by a secondary slurry flow meter 20. Then, a process parameter of the secondary slurry feed system 14 is controlled based on a ratio of the primary slurry catalyst composition flow rate to the secondary slurry catalyst composition flow rate.

In any embodiment herein, the process parameter is selected as a parameter of the secondary slurry feed system 14 that has a direct or indirect affect on the secondary slurry catalyst composition flow rate. In any embodiment, the process parameter has a strong enough correlation to the secondary slurry catalyst composition flow rate such that the ratio of the primary slurry catalyst composition flow rate to the secondary slurry catalyst composition flow rate may be effectively controlled by controlling the process parameter. In at least one embodiment, the process parameter of the secondary slurry feed system has a strong enough correlation to the secondary slurry catalyst composition flow rate to allow the ratio of the primary slurry catalyst composition flow rate to the secondary slurry catalyst composition flow rate to be controlled between about 0.8:1 to about 1.2:1, or between about 0.9:1 to about 1.1:1. Process parameters that provide a strong enough correlation to the secondary slurry catalyst composition flow rate may include the actual secondary slurry catalyst composition flow rate, a secondary carrier liquid flow rate, a secondary carrier gas flow rate, a backpressure in the secondary slurry feed system, or a pressure differential in the secondary slurry feed system.

Field tests have shown that the flow rate of the secondary carrier liquid 22 has a substantial affect on the flow of the secondary slurry catalyst composition 32. Thus, in some embodiments herein, the process parameter of the secondary slurry feed system may be selected as a secondary carrier liquid flow rate. In these embodiments, a secondary carrier liquid 22 is supplied and combined with the secondary slurry catalyst composition 32. The primary slurry catalyst composition flow rate and the secondary slurry catalyst composition flow rate are compared, for example in a secondary slurry flow controller 48. Then, the flow rate of the secondary carrier liquid 22 is increased or decreased to adjust the secondary catalyst composition flow rate relative to the primary slurry catalyst composition flow rate. For example, the secondary carrier liquid flow rate may be increased if the secondary slurry catalyst composition flow rate is higher than the primary slurry catalyst composition flow rate, or the secondary carrier liquid flow rate may be decreased if the secondary slurry catalyst composition flow rate is lower than the primary slurry catalyst composition flowrate.

In any embodiment, the primary slurry catalyst composition flow rate and the secondary slurry catalyst composition flow rate may be compared and controlled, for example by increasing or decreasing the secondary carrier liquid flow rate, by an automated control system. Automated control systems may be any automated control system, including electronic distributive control systems or computer control systems. In other embodiments, the control may be accomplished manually.

In any embodiment herein, the primary slurry feed system 12 may comprise a primary carrier liquid 28, and/or a primary carrier gas 38. Changing the flow rate of the primary carrier liquid 28 or primary carrier gas 38 may be used to adjust the primary catalyst composition flow rate. Adjusting the primary catalyst composition flow rate also affects the relative flows of the primary and secondary slurry catalyst composition 30, 32. Thus, in at least one embodiment, the primary carrier liquid flow rate or primary carrier gas flow rate may be adjusted to adjust the secondary catalyst composition flow rate relative to the primary slurry catalyst composition flow rate. For example, if the flow rate of the primary slurry catalyst composition is too high, the primary carrier liquid flow rate may be raised, which will lower the primary slurry catalyst flow rate. This has the affect of lowering the ratio of the primary slurry catalyst composition flow rate to the secondary slurry catalyst composition flowrate.

In any embodiment herein, the secondary slurry feed system 14, may supply a secondary carrier gas 40 to be combined with mixture of slurry catalyst composition and carrier liquid. The flow rate of the secondary carrier gas 40 has also been shown to affect the flow rate of the secondary slurry catalyst composition 32. Thus, in some embodiments, the process parameter of the secondary slurry feed system that is selected to affect the secondary slurry catalyst flow rate may be the secondary carrier gas flow rate. In these embodiments, the primary slurry catalyst composition flow rate and the secondary slurry catalyst composition flow rate may be compared. Then, the secondary carrier gas flow rate may be increased or decreased to adjust the secondary catalyst composition flow rate relative to the primary slurry catalyst composition flow rate. For example, the secondary carrier gas flow rate may be increased if the secondary slurry catalyst composition flow rate is higher than the primary slurry catalyst composition flow rate, or the secondary carrier gas flow rate may be decreased if the secondary slurry catalyst composition flow rate is lower than the primary slurry catalyst composition flowrate.

In any embodiment, the primary slurry catalyst composition flow rate and the secondary slurry catalyst composition flow rate may be compared and controlled, for example by increasing or decreasing the secondary carrier gas flow rate using an automated control system. The automated control system may be any automated control system, including electronic distributive control systems or computer control systems. In other embodiments, the control may be accomplished manually.

The primary slurry feed system 14, may further supply a primary carrier liquid 28 and/or a primary carrier gas 38. The flow rates of the primary carrier liquid 28 and primary carrier gas 38 affects the flow rate of the primary slurry catalyst composition 30. Thus, in some embodiments, the primary carrier liquid flow rate or primary carrier gas flow rate may be adjusted to adjust the primary catalyst composition flow rate. This affects the ratio of primary to secondary slurry catalyst composition flow rate, thus effectively adjusts the secondary catalyst composition flow rate relative to the primary slurry catalyst composition flow rate.

Injection Devices

The primary and secondary catalyst injection devices 18, 26 may be any design suitable for injecting the slurry catalyst composition into the polymerization reactor. U.S. Pat. Nos. 6,606,675, 6,608,149, and 6,956,089 discuss slurry catalyst compositions, systems for producing the slurry catalyst compositions, and injection equipment (devices) suitable for use with the current invention.

In any embodiment, the primary and secondary catalyst injection devices 18, 26 may comprise a catalyst injection tube that passes into the reactor through a packing and extends into the fluid bed. The depth of insertion typically depends on the diameter of the reactor and may extend in about 1/20 to 1/2 of the reactor diameter, about 1/10th to 1/2, or about 1/5th to 1/3rd of the reactor diameter.

The injection tube may be supported inside a structure (support tube) within the fluid bed to provide structural integrity. This support tube may be a heavy walled pipe with an internal diameter of from about 0.64 cm to about 12.7 cm (1/4 inch to 5 inches), about 1.3 cm to about 7.6 cm (1/2 inch to 3 inches), or about 1.9 cm to about 5 cm (3/4 inch to 2 inches). The support tube may extend through the reactor wall to approximately the length of the injection tube, allowing the injection tube to extend past it up to about 25.4 cm (10 inches), about 0.25 cm to 12.7 cm (0.1 to 5 inches), or about 0.25 cm to 7.6 cm (0.1 to 3 inches). In some embodiments, the injection tube may end just inside the end of the support tube. The end of the support tube in the reactor may be cut flat and perpendicular to the axis of the tube, or may be tapered at an angle ranging from about 10 to 80 degrees. The end of the support tube may be polished or coated with an anti-static or anti-fouling material.

A purge flow of fluid (typically fresh monomer, ethylene, hexane, isopentane, recycle gas, and the like) may be introduced from outside the reactor down the support tube to aid in dispersion of the catalyst composition allowing the production of resin granular particles of good morphology with decreased agglomeration and an APS (average particle size) in the range of about 0.01 cm to 0.3 cm (0.005 to 0.10 inches). The purge flow of fluid helps minimize fouling of the end of the catalyst injection tube and support tubes. In some embodiments, the exit of the support tube may be fashioned with a nozzle at the end to form a jet or dispersion of purge fluid to aid in the distribution of the catalyst composition. In some embodiments, the internal diameter of the support tube is reduced gradually in a taper to create a nozzle to accelerate to and or disperse the fluid flow.

Polymerization Processes

Embodiments described herein may be suitable for use in any polymerization process wherein a slurry catalyst is fed into multiple injection points. Processes may include gas phase fluid bed polymerization of one or more olefin, at least one of which may be ethylene, propylene or other monomers, in the presence of a catalyst (see, for example, U.S. Pat. Nos. 4,543,399, 4,588,790, 5,028,670, 5,317,036, 5,352,749, 5,405,922, 5,436,304, 5,453,471, 5,462,999, 5,616,661 and 5,668,228). Other polymerization processes, particularly gas phase fluid bed processes, may comprise a cycle fluid that comprises a gas phase and a liquid phase.

The process of this invention may be directed toward a gas phase polymerization process of one or more olefin monomers having from 2 to 30 carbon atoms, preferably 2 to 12 carbon atoms, or 2 to 8 carbon atoms. The invention is well suited to the polymerization of two or more olefin monomers of ethylene, propylene, butene-1, pentene-1,4-methyl-pentene-1, hexene-1, octene-1 and decene-1.

Other monomers useful in the process may include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In one class of embodiments, a copolymer of ethylene may be produced, where with ethylene, a comonomer having at least one alpha-olefin having from 3 to 15 carbon atoms, from 4 to 12 carbon atoms, or from 4 to 8 carbon atoms, may be polymerized in a gas phase process.

The reactor pressure in a gas phase process may vary from about 690 kPa gauge (100 psig) to about 4138 kPa gauge (600 psig), from about 1379 kPa gauge (200 psig) to about 2759 kPa gauge (400 psig), or from about 1724 kPa gauge (250 psig) to about 2414 kPa gauge (350 psig).

The reactor temperature in a gas phase process during the contacting step may vary from about 30° C. to about 120° C., about 60° C. to about 115° C., about 70° C. to 110° C., or about 70° C. to about 95° C.

Other gas phase processes contemplated by the invention may include series or multistage polymerization processes. Also gas phase processes contemplated by the invention may include those described in U.S. Pat. Nos. 5,627,242, 5,665,818 and 5,677,375, and European publications EP-A-0 794 200 EP-B1-0 649 992, EP-A-0 802 202 and EP-B-634 421.

The invention may also be directed to a polymerization process, for example, a gas phase polymerization process, for polymerizing propylene alone or with one or more other monomers including ethylene, and/or other olefins having from 4 to 12 carbon atoms. Propylene based polymers that may be produced in the process include atactic polypropylene, isotactic polypropylene, and syndiotactic polypropylene. Other propylene polymers include propylene random, block or impact copolymers.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A system for feeding a slurry catalyst composition comprising:
   (a) a primary slurry feed system comprising a primary slurry flow meter and a primary catalyst injection device, wherein the primary slurry flow meter measures a primary slurry catalyst composition flow rate to the primary catalyst injection device; and
   (b) a secondary slurry feed system comprising a secondary slurry flow meter, a secondary carrier liquid, a secondary carrier liquid control device, and a secondary catalyst injection device, wherein the secondary slurry flow meter measures a secondary slurry catalyst composition flow rate to the secondary catalyst injection device,
   wherein the secondary carrier liquid control device controls a process parameter of the secondary slurry feed system based on a ratio of the primary slurry catalyst composition flow rate to the secondary slurry catalyst composition flow rate, wherein the secondary slurry feed system further comprises a secondary carrier liquid flow meter, a secondary carrier liquid controller, and a secondary slurry flow controller, wherein the process parameter controlled by the secondary carrier liquid control device is a secondary carrier liquid flow rate measured by the secondary carrier liquid flow meter, wherein the secondary carrier liquid controller controls the secondary carrier liquid control device based on the secondary carrier liquid flow rate and a secondary carrier flow setpoint from the secondary slurry flow controller.

2. The system of claim 1, wherein the system for feeding a slurry catalyst composition comprises at least two secondary slurry feed systems.

3. The system of claim 1 wherein the secondary slurry feed system further comprises:
   (a) a secondary slurry flow control device;
   (b) a secondary carrier/catalyst mixer; and
   (c) a secondary carrier gas.

4. The system of claim 1, wherein the secondary slurry flow controller receives the secondary slurry catalyst composition flow rate as a measured process variable and the primary slurry catalyst composition flow rate as a process variable setpoint and generates the secondary carrier flow setpoint.

5. The system of claim 1, wherein the ratio of the primary slurry catalyst composition flow rate to the secondary slurry catalyst composition flow rate can be controlled at about 0.9:1 to about 1:1.

6. The system of claim 1, wherein the primary slurry feed system further comprises:
   (a) a primary slurry flow control device;
   (b) a primary carrier liquid;
   (c) a primary carrier liquid control device;
   (d) a primary carrier/catalyst mixer;
   (e) a primary catalyst injection device; and
   (f) a primary carrier gas.

7. A system for feeding a slurry catalyst composition comprising:
   (a) a primary slurry feed system comprising a primary slurry flow meter and a primary catalyst injection device, wherein the primary slurry flow meter measures a primary slurry catalyst composition flow rate to the primary catalyst injection device; and
   (b) a secondary slurry feed system comprising a secondary slurry flow meter, a secondary carrier gas, a secondary carrier gas control device, and a secondary catalyst injection device, wherein the secondary slurry flow meter measures a secondary slurry catalyst composition flow rate to the secondary catalyst injection device,
   wherein the secondary carrier gas control device controls a process parameter of the secondary slurry feed system based on a ratio of the primary slurry catalyst composition flow rate to the secondary slurry catalyst composition flow rate, wherein the secondary slurry feed system further comprises a secondary carrier gas flow meter, a secondary carrier gas controller, and a secondary slurry flow controller, wherein the process parameter controlled by the secondary carrier gas control device is a secondary carrier gas flow rate measured by the secondary carrier gas flow meter, wherein the secondary carrier gas controller controls the secondary carrier gas control device based on the secondary carrier gas flow rate and a secondary carrier flow setpoint from the secondary slurry flow controller.

8. The system of claim 7, wherein the secondary slurry flow controller receives the secondary slurry catalyst composition flow rate as a measured process variable and the primary slurry catalyst composition flow rate as a process variable setpoint and generates the secondary carrier flow setpoint.

9. The system of claim 7, wherein the ratio of the primary slurry catalyst composition flow rate to the secondary slurry catalyst composition flow rate can be controlled at about 0.9:1 to about 1:1.

10. The system of claim 7, wherein the primary slurry feed system further comprises:
   (a) a primary slurry flow control device;
   (b) a primary carrier liquid;
   (c) a primary carrier liquid control device;
   (d) a primary carrier/catalyst mixer;
   (e) a primary catalyst injection device; and
   (f) a primary carrier gas.

* * * * *